Dec. 16, 1924.  1,519,177
E. F. VOLKMER
MACHINE FOR FORMING AND WRAPPING PACKAGES
Filed Feb. 19, 1920   8 Sheets-Sheet 1
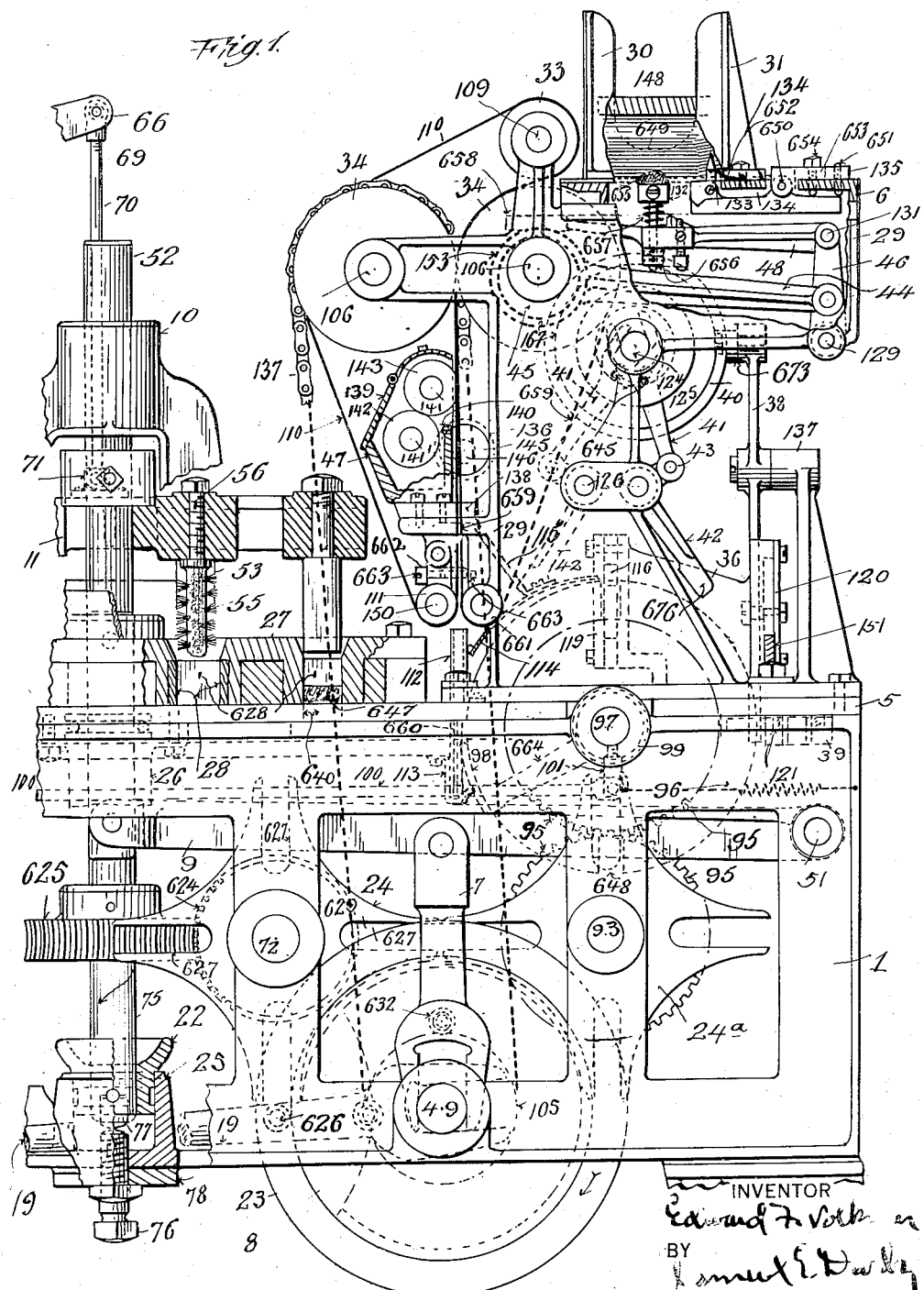

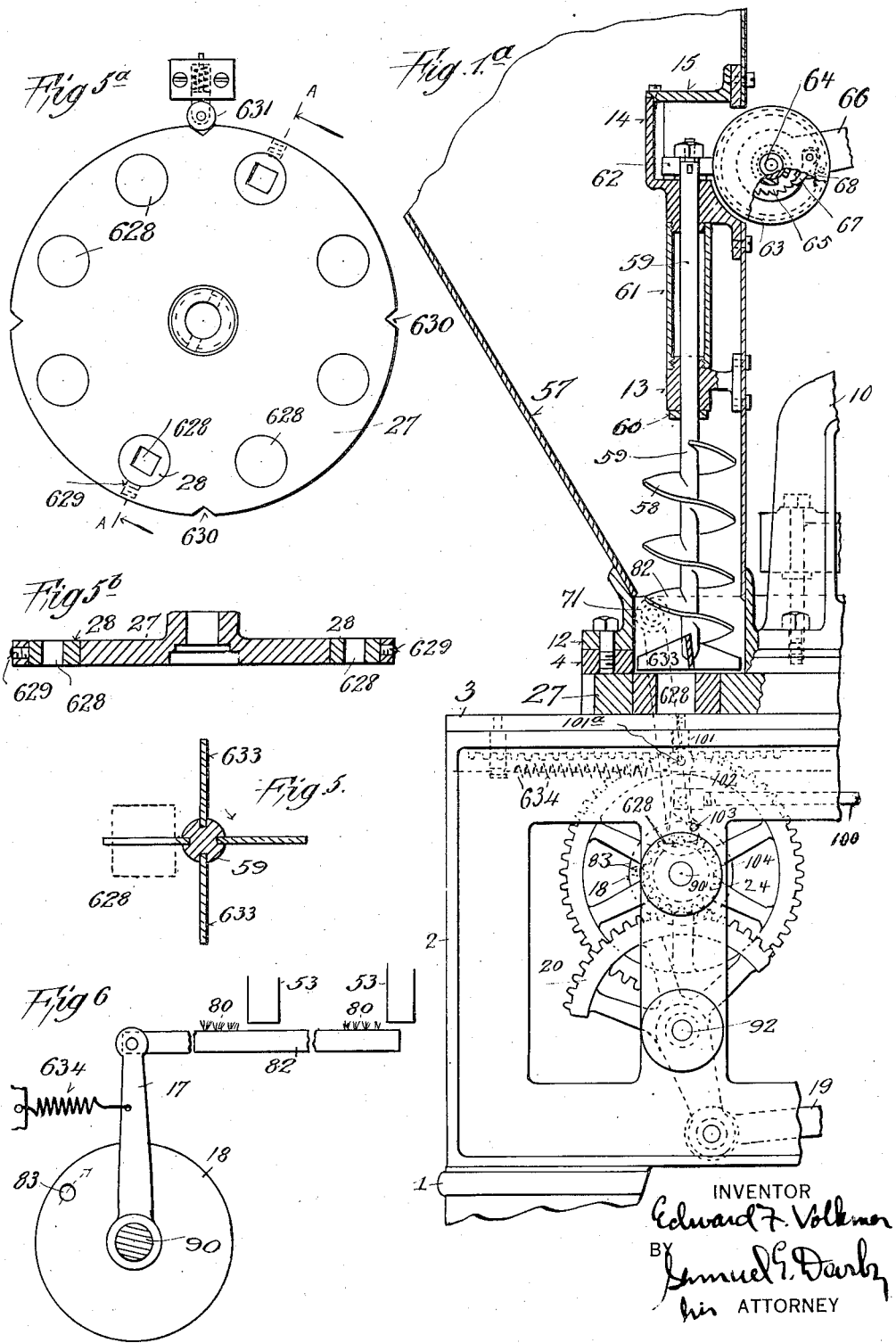

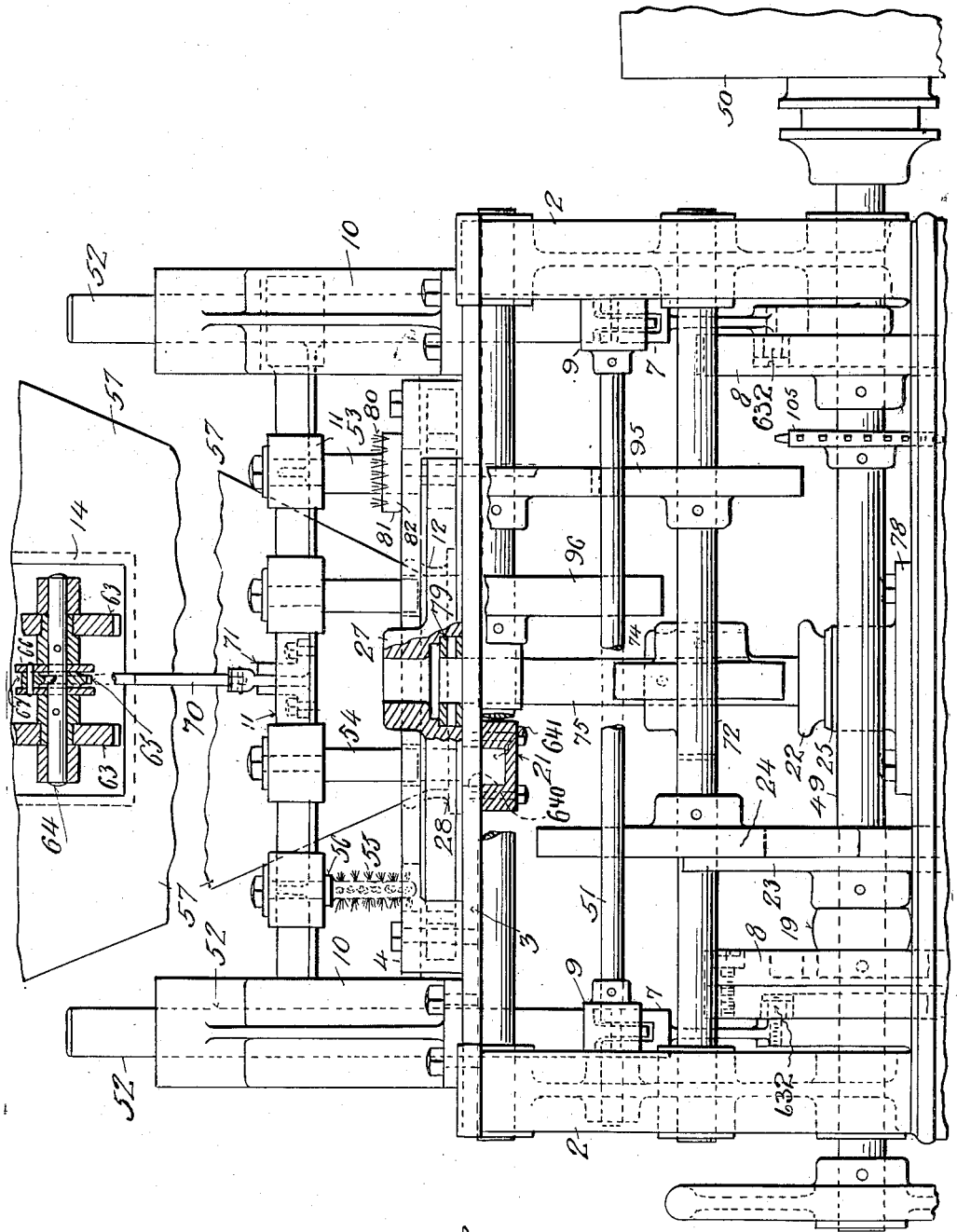

Dec. 16, 1924.
E. F. VOLKMER
1,519,177

MACHINE FOR FORMING AND WRAPPING PACKAGES

Filed Feb. 19, 1920
8 Sheets-Sheet 4

INVENTOR
Edward F. Volkmer
BY
ATTORNEY

Dec. 16, 1924.

E. F. VOLKMER 1,519,177

MACHINE FOR FORMING AND WRAPPING PACKAGES

Filed Feb. 19, 1920   8 Sheets-Sheet 5

INVENTOR
Edward F. Volkmer
BY
his ATTORNEY

Dec. 16, 1924.
E. F. VOLKMER
1,519,177
MACHINE FOR FORMING AND WRAPPING PACKAGES
Filed Feb. 19, 1920   8 Sheets-Sheet 6
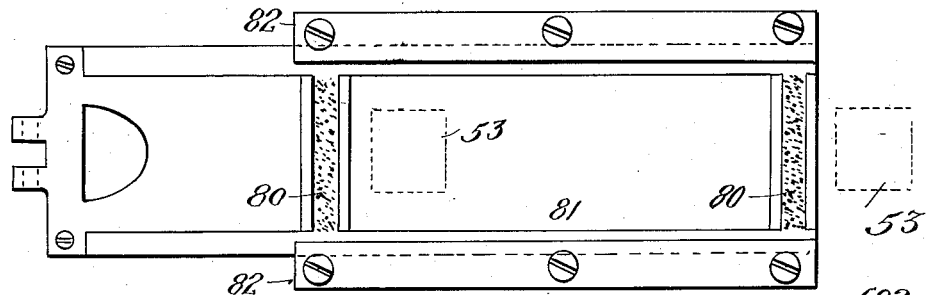
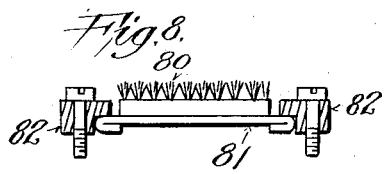
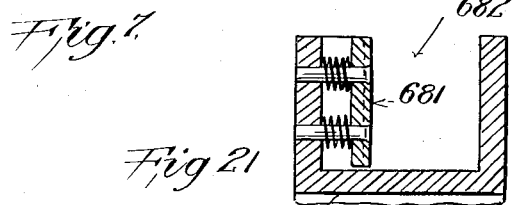
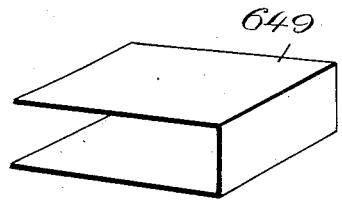
Fig 22
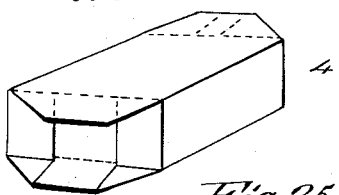
Fig 25
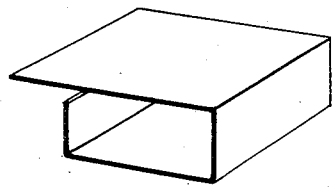
Fig 23
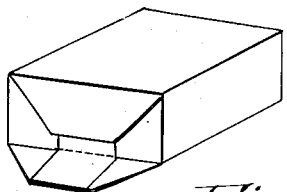
Fig 26
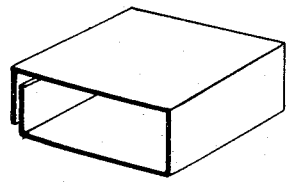
Fig 24
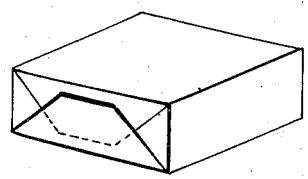
Fig 27
INVENTOR
Edward F. Volkmer
BY Samuel E. Darby
his ATTORNEY Dec. 16, 1924. 1,519,177
E. F. VOLKMER
MACHINE FOR FORMING AND WRAPPING PACKAGES
Filed Feb. 19, 1920   8 Sheets-Sheet 7
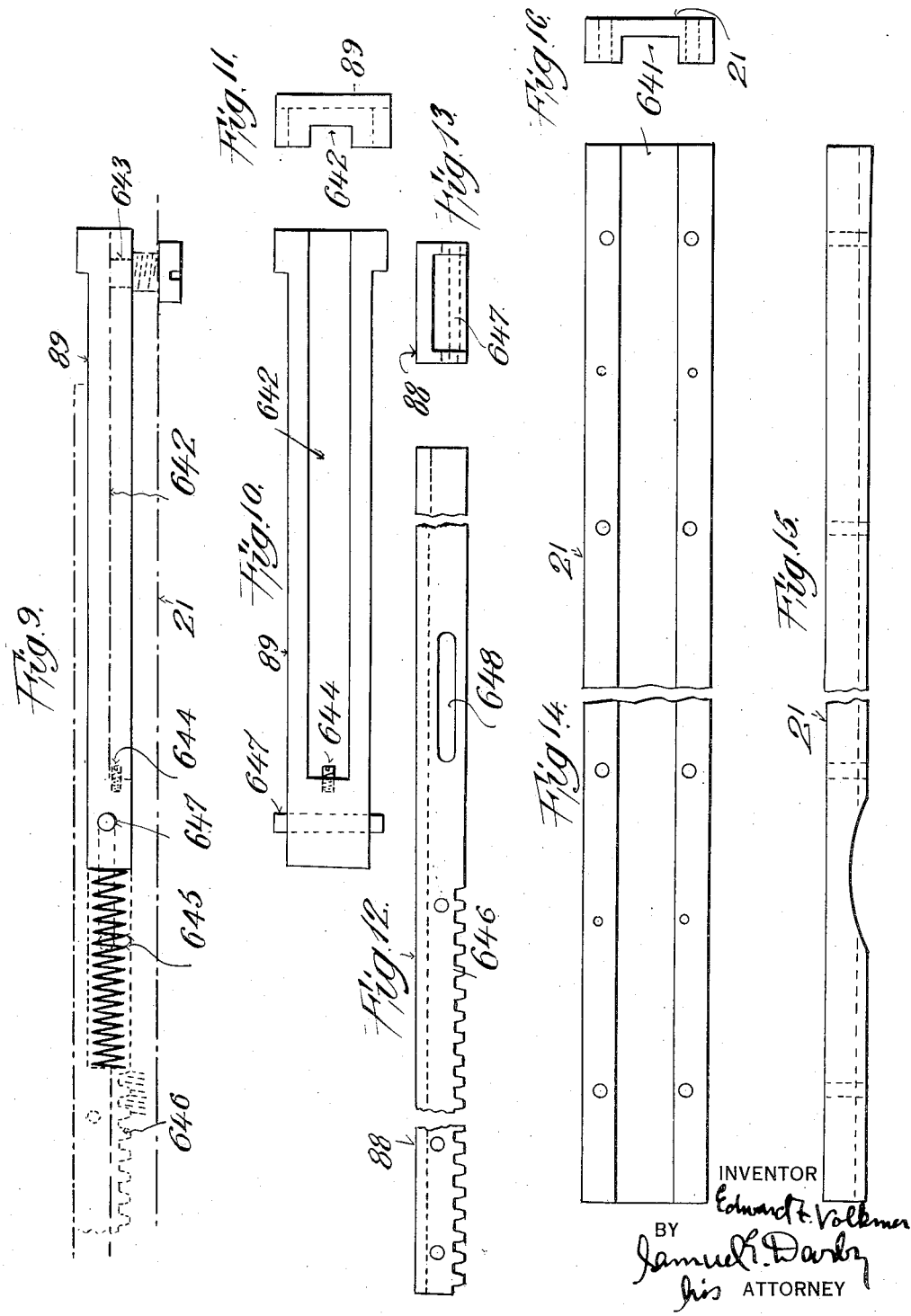

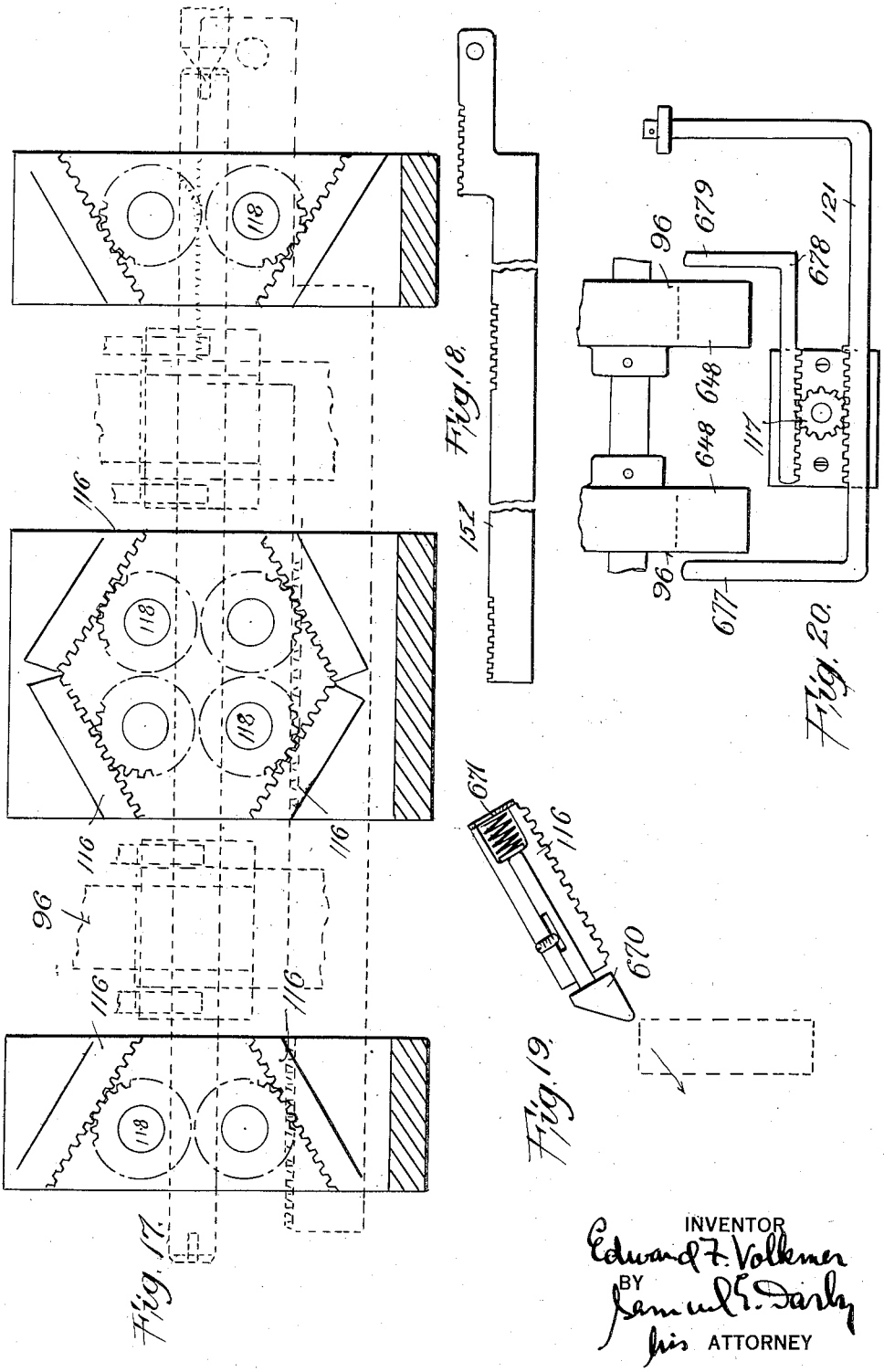

Patented Dec. 16, 1924.

1,519,177

UNITED STATES PATENT OFFICE.

EDWARD F. VOLKMER, OF BROOKLYN, NEW YORK.

MACHINE FOR FORMING AND WRAPPING PACKAGES.

Application filed February 19, 1920. Serial No. 359,954.

*To all whom it may concern:*

Be it known that I, EDWARD F. VOLKMER, a subject of Germany, but who has taken out first papers to become a citizen of the United States, residing at Brooklyn, county of Kings, State of New York, have made a certain new and useful Invention in Machines for Forming and Wrapping Packages, of which the following is a specification.

This invention relates to machines for forming and wrapping packages.

The object of the invention is to provide an apparatus of this nature which is simple in structure and efficient in operation.

A further object of the invention is to provide a machine of the character referred to which will simultaneously form material into a plurality of packages and also will apply and fold wrappers therearound.

Further objects of the invention will appear more fully hereinafter.

The invention consists substantially in the construction, combination, location, and relative arrangement of parts, all as will be more fully hereinafter set forth, as shown in the accompanying drawings, and finally pointed out in the appended claim.

Referring to the accompanying drawings and to the various views and reference signs appearing thereon,—

Figs. 1 and 1ª are views in side elevation, parts in vertical section, and parts broken off, showing a construction of multiple package forming and wrapping machine embodying the principles of my invention.

Fig. 2 is a view in end elevation of the same, parts broken off, and parts in section.

Fig. 5 is a detail view somewhat diagrammatic showing the structure of scraper employed in the material feeding part of the machine.

Figure 3:
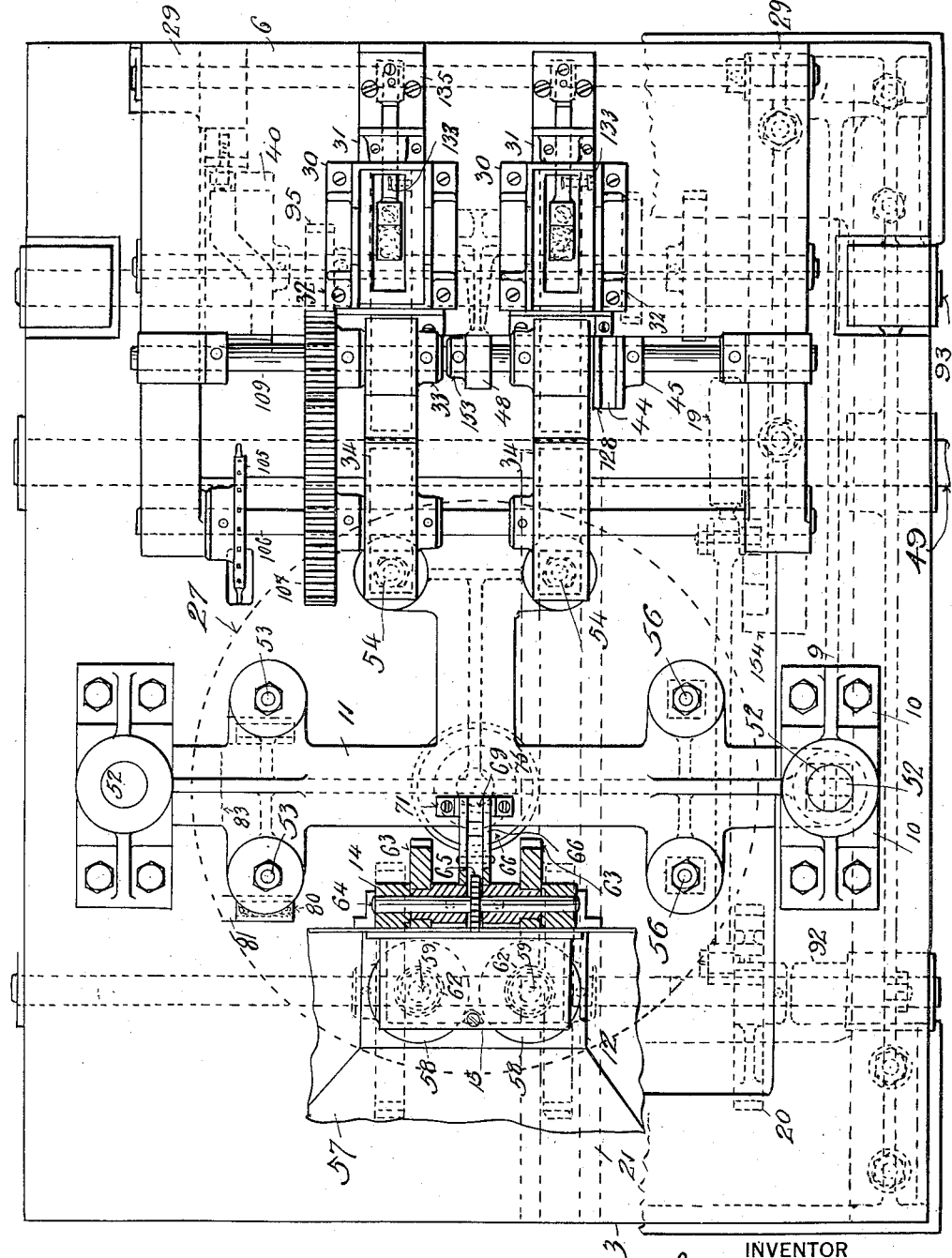
Fig. 3 is a top plan view of the same, parts in horizontal section.

Figs. 5ᴬ and 5ᴮ are detail views in top plan and central section respectively of the carrier.

Fig. 6 is a detached detail view showing parts employed in connection with the operation of the compressing plunger cleaning brushes.

Fig. 7 is a detached detail view in plan of the slide plate carrying the compressing plunger cleaning brushes.

Fig. 8 is a view in transverse section of the same.

Figs. 9, 10 and 11 are detail views in side elevation, top plan, and end views respectively, showing the construction and arrangement of spring operated plunger and stop.

Figs. 12 and 13 are detail views in side elevation and end view respectively of the rack employed to accommodate the spring operated plunger.

Figs. 14, 15 and 16 are detail views in plan, side elevation, and end view respectively, of the guide for the plunger operating rack.

Fig. 17 is a detail view somewhat diagrammatic showing a portion of the wrapper folding devices.

Fig. 18 is a detached detail view of the rack employed for operating the wrapper folding plungers shown in Fig. 17.

Fig. 19 is a detail view showing one of the folding plungers.

Fig. 20 is a detached detail view showing the operation of the ejecting mechanism for the completely wrapped packages.

Fig. 21 is a fragmentary view showing a form of receiving pocket in the package transfer carrier embodying the principles of my invention.

Fig. 22 is a view in diagram showing the initial fold or bend in the wrapper in the application thereof to a package.

Fig. 23 is a similar view showing the first folding operation wherein one end of the wrapper is folded upon the package.

Fig. 24 is a similar view showing the result of the third operation of folding over the other end of the wrapper.

Fig. 25 is a similar view showing the action of the folding devices illustrated in Fig. 17.

Fig. 26 is a similar view showing the result of the operation of the end folding devices.

Fig. 27 is a similar view of the completed package and ready to be ejected from the machine.

The same part is designated by the same reference numeral wherever it occurs throughout the several views.

In carrying out my invention I propose to provide a machine of simple structure and efficient in operation for forming material into packages and applying to each package a wrapper and folding the ends and edges of the wrapper neatly and efficiently upon the package, and in accordance with the principles of my invention I propose in one form of apparatus to simultaneously form and apply wrappers to a plurality of packages. Particularly, my invention is designed to form material of the nature of a powder, such, for example, and merely by way of illustration, as bluing powder, into packages or cakes, although it is to be understood that a machine embodying my invention is equally well adapted for use in forming other material into cake or package form. Also in carrying out my invention the material to form the packages or cakes is measured, that is, is supplied in equal quantities to the package forming devices so as to secure uniformity and equality of quantity of material in the successive cakes or packages into which the same is formed. To this end, and in a general statement of the nature of my invention, I employ a rotatable table or carrier having pockets, into which the powder, or other mass to be formed into packages and wrapped, is delivered.

Associated with the table are powder or mass delivery means which operate in proper time relation to deliver the powder or mass successively into the packages in the table or carrier after each operation of the delivery means. Then the table or carrier is advanced or rotated through a step of operation thereof into position for the filled pocket to be brought under a suitable compressing plunger whereby the material contained in the pocket is suitably compacted and compressed into compact form of uniform density and size. While the table is in position for the compressing plungers to operate to compress the mass of material or powder contained in a pocket thereof, another pocket of the table is brought into conjunction with the supplying apparatus to receive another charge of the powder to be formed into a package and wrapped. The next step of operation of the table brings an empty pocket of the table into position to receive another charge of powder and the immediately preceding filled pocket into position for the powder or mass contained therein to be compressed, and the previously compressed cake or body of the material into position to be ejected from the carrier for further operation of the machine to apply a wrapper thereto. The next step of operation of the rotatable carrier brings the pocket from which the compressed package was just ejected into position to be cleansed, ready to receive the next charge of powder material. I also propose in accordance with the principles of my invention to provide suitable means to receive the compressed packages in successive order as delivered from the package forming part of the mechanism and apply thereto wrappers, labels, or the like, and to fold the wrappers upon the compacted and compressed cakes or bodies of material so as to produce as a final product a neatly formed, compacted and wrapped package. The several operations referred to are accomplished in accordance with my invention in timely relation with respect to each other and automatically by the operation of a simple mechanical structure which is efficient in operation.

Referring specifically to the drawings, reference numeral 49 designates a main drive shaft of the machine adapted to be driven from any suitable or convenient source of power, said shaft being suitably journaled in the main frame work 1, 2, of the machine. The various working parts of the machine are driven from the main shaft 49 and through suitable arrangement of gear connections. I will first describe an arrangement as one form of embodiment of my invention for driving the rotary carrier constituting part of the package forming mechanism. In a suitable step bearing 25 suitably mounted upon a cross member 78, bolted to the frame work of the machine, is received a vertically disposed shaft 75, the vertical position of which, if desired, may be adjusted by means of an adjusting screw 76, upon which rests a bearing piece 77 mounted in a seat in the end of said shaft. This shaft operates through a suitable bronze sleeve 22 fitted into the bearing 25 and constituting an oil cup arrangement for lubricating said shaft. Upon said shaft is mounted a spiral gear 625 which meshes with and is driven from a cooperating spiral gear 624 mounted upon a counter shaft 72 suitably journaled in the main frame. The shaft 72 is driven through step by step operations in any suitable or convenient manner from the main drive shaft 49. A simple arrangement is shown wherein a cam disk 23 carried by shaft 49 carries a pin 626, which, during the continuous rotations of shaft 49, are successively brought into pockets 627 of a star wheel 24 mounted upon shaft 72, so that at each complete revolution of main shaft 49 shaft 72 is rotated through one-quarter of a turn thereby through the intermeshing of the spiral gears 624, 625, imparting a quarter revolution to shaft 75. The package forming and carrier disk 27 is mounted upon and rotates with shaft 75, said carrier resting upon a top plate 3 of the machine frame. If desired, and preferably, the vertical shaft 75 may be supported or suspended in vertical position upon a ball bearing support 79 therefor.

By this construction it will be seen that with each revolution of the main drive shaft 49 a step of rotary movement is imparted to the carrier 27, thus bringing the pockets 628 thereof successively into position to receive a charge of powder, or other material to be packaged and wrapped, to be compressed into compact cake form and to be ejected from the carrier.

Referring to Figs. 5ᴬ, 5ᴮ, it will be seen that each of the pockets 628 receives a bushing 28, and the pockets 628 are formed in this bushing. For simplification of illustration I have indicated only diagrammatically in Fig. 5ᴬ, by means of circles which I have marked 628, the packages as well as the bushings in which such packages are formed. The bushings 28 may be held within the openings through the carrier disk 27 in any suitable or convenient manner, as for example, by means of the set screws 629. It will be understood that the pockets 628 may be of any suitable or desired shape or configuration, depending upon the cake or package to be produced. In the particular form shown, to which, however, my invention is not to be limited or restricted, a rectangular shaped pocket is employed. It is important to prevent an overthrow of the carrier disk 27. That is, it is important that the rotative movement of said carrier be arrested exactly at the right point for the pockets 628 to register with the feeding, compressing and ejector devices. Various arrangements might be employed to insure this result. I have shown a simple arrangement embodying the principles of my invention, to which, however, I do not desire to be limited or restricted, wherein I form notches or seats 630 in the peripheral edge of the carrier disk 27 and spaced apart from each other corresponding to the extent of annular movement imparted thereto by the step by step rotative actuation of shaft 75, and cooperating with these seats or notches is a spring pressed roller or projection 631, see Fig. 5ᴬ, suitably mounted upon a convenient stationary part of the frame and arranged to snap into a seat or recess 630 to prevent overthrow of said carrier disk and to hold and position the same in proper relation with reference to the plunger or other devices employed in connection therewith, and in proper timing relation with respect to the action of the star wheel through which the shaft 75 is driven.

While I have shown my invention as applied to a star wheel which operates through a quarter of a revolution for each rotation of the main shaft, it is to be understood of course that my invention is not to be limited or restricted in this respect since any other ratio of rotative movement might be employed. It will also be seen that the carrier plate 27 is formed in the particular arrangement shown in the drawings with eight pockets. This, ordinarily, would be the arrangement in the case of a duplex machine, that is, a machine in which the carrier plate receives simultaneously two charges of the powder or other mass to be packaged, and those two charges are simultaneously compacted or compressed by the compressing plungers, and those two compressed packages are simultaneously ejected from the carrier. This arrangement, however, as above indicated, is merely illustrative, as it is obvious that one or any desired number of packages may be formed and ejected simultaneously.

I will now describe the arrangement for feeding and supplying the powder or other material to the receiving pockets of the rotatable carrier.

Operating over and guided by the main shaft 49 is a yoke 7 carrying a stud or pin 632 arranged to operate within a cam groove formed on the face of a cam disk 8 mounted upon and rotating with the main shaft. By the engagement of the stud or pin 632 in the cam groove of disk 8 vertical reciprocations are imparted to the yoke 7. This yoke is connected to a lever 9 hinged or pivoted upon a shaft 51 suitably journaled in the frame work of the machine. The other end of the lever 9 is connected to a vertically disposed plunger 52. In the case of a duplex machine such as shown in the drawings, two sets of yokes 7, levers 9, and vertically disposed plungers 52, are employed. These plungers 52 are thus given a complete reciprocation upwardly and downwardly in the direction of their length through a throw dependent upon the throw of the cam groove in the cam disk 8 on the main drive shaft. Carried by the plungers 52 to move vertically therewith is a carrier member 11. Mounted upon the carrier member 11 is a yoke 71, to which is connected a rod 70, to the upper end of which is pivotally connected an arm 66, which is sleeved upon a stud shaft 64 suitably journaled in arms on a fixed part of the frame work. Upon this shaft is mounted a ratchet wheel 65, with which cooperates a pawl 67 carried by the rocking arm 66. A spring 68 serves to press the pawl 67 into engagement with the ratchet teeth of ratchet disk 65. Through the vertical reciprocations imparted to rod 70 the stud shaft 64 is rotated intermittently. Upon the shaft 64 are mounted spiral gears 63, one or more, according to whether the machine is a single or a duplex or other multiple machine. In the case of a duplex machine such as is shown two spiral gears 63 are carried by the shaft 64. Each of these spiral gears mesh with and drive a spiral gear 62 upon a vertically disposed shaft 59 suitably journaled in brackets 13 and 14 carried upon a fixed part of the frame work. If desired, and in order to protect the gearing against access thereto of the powder material to be packaged a cover plate 15 may be applied to the housing 14 to enclose and cover the gear 62. Likewise, the shaft 59 may be enclosed within a tubular cover 61. The shafts 59 are disposed vertically in a hopper 57 into which the mass of powder or other material to be packaged is delivered. Carried by each shaft 59 is a spiral conveying flange 58, the action of which is to feed the powder or other material contained in the hopper 57 downwardly towards the receiving pockets 628 in the carrier 27 which operates beneath the bottom or delivery end of the hopper. In practice I place a plate 4 over the carrier 27 to serve as a cap or cover plate and the base 12 of the hopper is bolted upon said plate. Instead of the spiral conveyor extending to the lower extremity of the shaft 59 I prefer to employ what I shall term "scrapers" 633, at the lower end of each of the shafts 59. These scrapers are simply sheets of metal plate which are disposed vertically and suitably fastened, as, for example, in slots in the lower end of shaft 59, see Fig. 5. In practice, and as shown, although I do not desire to be limited in this respect, I employ four scrapers 633 for each shaft, and the timing of the machine is so regulated that at least two of these plates or scrapers operate over each pocket in the carrier in the operation of filling such pocket. These scraper devices insure a proper filling of the pockets and a levelling off of the same when filled. It is to be understood, of course, that other devices may be employed for effecting this leveling off of the material in the pockets as said pockets become filled therewith.

I will now describe means for compressing the powder or other material supplied to the pockets in the carrier and for ejecting the compressed packages from said carrier and for cleaning the pockets from which the compressed material has been ejected preparatory to receiving fresh charges of such material.

The member 11 carried by the vertically operating plungers 52 is equipped with a set of compressing plungers 53, with a set of ejecting plungers 54, and a set of cleaning brushes 56. These sets of devices are disposed in proper relation to each other to act successively with reference to the pockets in the rotating carrier 27. After a pocket has received its charge of powder or other material to be packaged, the carrier is rotated to bring the filled pocket into cooperative relation with respect to a compressing plunger 53. The rotation of the carrier is effected while the frame member 11 is in its raised position. The carrier is then retained in the position to which it has been rotated, and the plungers 52 move downwardly, thereby causing the plunger or plungers 53 to enter the pocket or pockets 628 to compact and compress the material in such pockets. On the next upstroke of the plungers 52 the compressing plungers are raised out of the pockets in the carrier to permit said carrier to rotate through another step of its rotative movement. In the case of some classes of powder or material to be packaged the danger is incurred of particles of the powder or material remaining adhering to the end face of the compressing plungers when the latter are withdrawn from their compressing action. This is undesirable for the reason that when the plungers are again advanced to effect compression the adhering particles left on the compressing face of the plungers in their previous operation will tend to injure the uniform outline and contour of the material to be packaged, and, moreover, additional quantities of the powder material will adhere to that previously retained on the face of the plunger, and hence an increasing volume of the powder will remain adhering to the plunger face, thereby destroying uniformity in the size and quantity of material contained in the packages. To avoid this trouble, I propose to clean off the working face end of the compressing plungers after each operation thereof. This may be accomplished in many different ways. A simple arrangement in shown, see particularly Figs. 6, 7 and 8, wherein suitable brushes 80 are mounted in a slide plate 81 mounted to slide in suitable guides 82 in a path to carry said brushes across the lower working faces of the plungers 52 when the latter are elevated into their raised position. The slide plate 81 may be operated in any suitable or convenient manner. A simple arrangement is shown wherein a lever 17 is pivotally connected to the slide 82, said lever being acted upon by a suitable spring 634 normally tending to rock the same in a direction to hold the brushes out of line with the working faces of the plungers 53. The lever 17 is sleeved upon a shaft 90 suitably journaled in the frame work of the machine. Upon this shaft is mounted a disk 18 to and rotatively moved therewith when said shaft is rocked from the main shaft through the arm 19 and segment 20. See Figs. 1 and 1ª. A pin 83 carried by said disk engages the lever 17 and rocks the same against the action of spring 634 and in a direction to throw the brush slide so as to carry the brushes 80 past the working faces of the plungers 53, thereby keeping said plungers or the working faces thereof, free and clear of accumulations of powder or material.

The member 11 carried by the plungers 52 also supports the ejecting plunger or plungers 54, for example, in the case of a twin or duplex machine, a pair of plungers 54, the function of which is to eject the compressed mass or masses of material from the carrier 27, or from the pockets 628 in said carrier when the latter has been rotated in position to bring the pocket or pockets containing the compressed mass into line with the plunger or plungers 54. When the carrier is in this position the pocket or pockets 628 therein containing the compressed masses of material are brought not only into line with the plunger or plungers 54 but also in line with an opening or openings 640, see Fig. 1, in the bed plate 3, upon which the carrier 27 rests, so that the mass of compressed material indicated at 641 may be forced out of the pockets 628 and through the opening 640 in the bed plate 3 by the action of the plunger or plungers 54.

The member 11 also carries the brushes indicated generally at 56, the brushes proper being indicated at 55, see Figs. 1 and 2. After the compressed package or packages have been ejected by the action of the ejector plungers 54, the next step of rotative movement imparted to the carrier 27 brings the pocket or pockets 628, from which the compressed package or packages have been ejected into line with the vertically acting cleaning brushes 55, 56, which, when the plungers 52 are again actuated are carried down into the pockets 628 thereby cleansing said pockets of any adhering particles of powder or other material operated on, so that at the next step of operation the cleansed pockets will be brought into position to receive another charge of material to be formed into packages.

In the above description I have described the successive operations of rotating step by step the carrier 27 so as to receive in the pockets therein charges of the material to be packaged, then compressing the charges, then ejecting the compressed charges, and then cleaning out the pockets to receive the next charge.

I will now describe the structure for receiving the ejected formed and compressed mass and for transferring the same to the wrapping mechanism by which wrappers or labels are applied to the formed masses. In this connection, attention is called to the detailed views, Figs. 9, 10, 11, 12, 13, 14, 15 and 16. Disposed beneath the top plate 3 is a guide plate 21, having in the upper surface thereof a channel 641, and when the compressed mass or masses of material is or are ejected from the carrier 27, said masses are deposited into said channel 641, a guide 21 being disposed in such relation to the opening 640 in the top plate as to permit the compressed masses to pass through said openings 640 and into the channel 641. Operating in the channel 641 is a plunger 89. When this plunger is operated or advanced along the channel 641 the forward end thereof engages the compressed body of material deposited into said channel and forces the same along said channel for delivery into the wrapping mechanism, as will presently be more fully explained. A rigid unyielding operation of this plunger would be liable to crush the compressed mass of material or to cause the same to break off or crumble, thereby marring its compact uniform shape, and otherwise causing quite undesirable results. For this reason it is important to actuate the plunger through a yielding drive arrangement so as to secure a cushioning action in the operation of the plunger. It is also desirable to adjustably limit the extent of ejecting movement of the plunger 89. To accomplish these results I form a longitudinally extending slot or channel indicated at 642 in the under surface of the plunger 89, and I tap a convenient stop device 643 through the guide 21 so as to project or extend into the slot 642 in the plunger to form a limit for the movement thereof. The extent of movement of the plunger in projecting direction may be adjustably regulated in any simple, suitable or convenient manner, as, for example, by means of an adjusting set screw 644, which abuts against the stop 643 at the limit of projecting movement of the plunger. By this construction I am enabled to avoid the objection due to any overthrow of the plunger 89 through its own momentum or otherwise. The plunger 89 is received slidingly within a member 88, which is fitted into the channel 641 of plate 21, and a spring 645 is interposed between the end of the plunger 89 and a convenient shoulder or wall formed on the member 88. This member 88 is formed with or carries a rack 646, by which said member 88 may be reciprocated. This rack is intermeshed with a gear 87 on shaft 90 see Fig. 1ª, so that when said shaft 90 is oscillated by the segment member 20, as above described, the member 88 and its rack are reciprocated in the channel 641. In order to positively return the plunger 89 after the same has been projected, I provide said plunger with a transversely extending pin 647, the ends of which engage in longitudinal slots 648ª, formed through the sides of the operating member 88. This construction permits a range of freedom of movement of the plunger 89 with reference to the operating member 88, and hence enables the spring cushion 645 to accomplish its purposes of yieldingly actuating the plunger.

I will now describe the construction, arrangement and operation for receiving the compressed bodies or masses of material ejected from the forming mechanism by the action of the plungers 89, and for applying thereto wrappers, labels, or the like, folding the same upon such masses or bodies, and finally ejecting the completed and wrapped package from the machine.

The disk or wheel 23 on the main drive shaft 97 carries the stud or pin 626 on the face thereof, which, as above described, actuates the star wheel 24 on shaft 72, from which the plungers carrying the frame member 11 of the package forming apparatus is actuated. The pin or stud 626 also operates a second star wheel 24ᵃ imparting a step by step rotative movement thereto. This star wheel is carried by shaft 93, which rotates with said star wheel. Through intermeshing gears 95 carried by shaft 93 and an adjacent shaft 97 suitably journaled in the frame work of the machine the said shaft 97 is driven from shaft 93. Upon said shaft, to revolve therewith, is a carrier 96, having radially extending pockets 648 in the periphery thereof. In the case of a duplex or multiple machine there will be two or more of these carriers 96. In the timing arrangement of the machine, one of the radial pockets 648 of the disk 96 is brought into register with the channel 641 and is held in such registering relation during the forward action of the plunger 89, so that a formed and compressed mass of material deposited into said channel in advance of the plunger is forced by the plunger through the channel and into the seat or pocket 648 in register therewith. During the succeeding step by step actuations of the disk 96, the wrapper folding, and finally the ejecting operations, are accomplished as will appear more fully presently. Before the compressed package is forced into a pocket 648 in the carrier 96, a wrapper or label 649 is interposed between said pocket and the advancing compressed mass of material to be deposited into said pocket and transversely of the line of advancing movement of the compressed mass of material.

My invention contemplates and includes suitable mechanism and devices for properly presenting the wrapper or label into position to be forced into pockets 648 along with the compressed mass or body of material. I will now describe one arrangement for accomplishing this result of presenting the wrapper or label in proper position and relation, it being understood that my invention is not to be limited or restricted in respect to the particular arrangement shown for accomplishing this purpose. In the arrangement shown I provide a rack or holder, formed, in this illustration, of uprights 31, 32, having flanges 30, forming a rack, into which a bundle or pile of wrappers or labels indicated at 649 are deposited. A suitable weight 148 placed upon the top of such stack or pile tends to press said stack or pile downwardly with a desired degree of pressure. The bottom of the rack is open, and suitable feeding devices are employed for successively removing from the stack or pile 649, or from the bottom thereof, individual wrappers or labels, detaching the same from the stack or pile and feeding them singly forward to suitable transferring mechanism, to be eventually deposited into position across the path of movement of the compressed mass of material. In order to efficiently retain the wrappers or labels, and to afford a convenient resistance to the action of the feeding devices which detaches and feeds the lowermost wrapper or label from the stack or pile, I provide a suitable needle or knife 133, designed to be projected upwardly slightly into the stack or pile of labels from the bottom thereof. This needle or knife is carried by an arm 134 which is capable of a desired degree of adjustment. In practice I fulcrum the arm 134 as at 650 to a convenient fixed part of the frame. In order to rock the holder or arm 134 in a direction to cause the needle or knife to penetrate into the stack or pile of wrappers or labels and to an adjustable extent I tap a suitable set screw 651 through a fixed part of the frame work 6 so as to engage the end of the holder arm 134 and rock the same adjustably about its fulcrum, and preferably against the action of a spring 652 so as to secure a desirable degree of tension. It is also desirable to secure a range of adjustment of the holder or arm 134 in the direction of its length so as to regulate and control the point at which the needle or knife penetrates the stack or pile of wrappers or labels. For this purpose I have shown the fulcrum 650 of the holder arm 134 as carried in block 135 which is slotted as indicated at 653, and through which operates a clamp screw 654, by which means the block 135 may be adjusted to the desired degree upon the fixed part 6 of the frame work.

The action of the needle or knife is to penetrate into a few of the lowermost labels or wrappers contained in the rack and retain them therein. When the feeder device operates to remove the lowermost wrapper or label from the stack or pile, the needle or knife blade opposes a slight resistance to the withdrawal or removal of the lowermost wrapper or label, but permitting the same to be slitted through by reason of the sharp edge of the knife or needle.

The feeding device by which the lowermost wrapper or label of the stack or pile is removed may be of any suitable or convenient structure and operated in any suitable or convenient manner. A simple arrangement is shown, to which, however, my invention is not to be limited to restricted, wherein a holder 132 is employed, upon the upper end of which is mounted a pad 655 of rubber or other suitable material which is designed to be brought into surface contact with the lower surface of the lowermost wrapper or label in the stack, and when the holder 132 is properly actuated to frictionally force the lowermost wrapper out of the rack and deliver the same into the feeding mechanism presently to be described. The holder 132 is adjustably and yieldingly mounted in an operating lever arm 48. The desired adjustment of the holder 132 in the lever arm 48 may be accomplished in any convenient way. I have shown simple set nuts 656 which accomplish this purpose. The stem carrying the holder 132 operates loosely through the lever arm 48, and a spring 657 is interposed between the holder 132 and the lever arm 48 to yieldingly press the holder 132 and the friction pad 655 upwardly. The operating lever arm 48 is given an oscillatory or combined oscillating and reciprocating movement in order to advance the friction feeder pad 655 against the lowermost wrapper in the rack and to carry the same in a direction to force said wrapper or label out of the rack and then withdrawing said feeder devices and retaining the same in withdrawn position during its return movement ready to feed forward the next succeeding wrapper in the orderly timing operation of the machine. A simple arrangement for accomplishing this purpose is shown wherein the arm 48 is fulcrumed as at 131 to rock or swing vertically upon the end of an arm 46 which is pivotally mounted upon a shaft 129 to rock or swing in a vertical plane. Connected to the arm 46 is an eccentric arm 44. This eccentric arm is actuated by an eccentric 45 mounted upon a shaft 106 suitably journaled in the frame work and driven as will be presently explained. The lever arm 48 has an extension 658 which rests upon a cam 153, see Figs. 1 and 4, which cam is also carried by shaft 106. Thus it will be seen that through the action of the eccentric 45 connecting rod 44 and link 46 a longitudinal reciprocating movement is imparted to the arm 48 which carries the feeder block 132 and pad 655. During this reciprocatory movement imparted to said arm 48, said arm is rocked vertically, that is, raised and lowered, by reason of extension 658 thereof riding upon the peripheral surface of the cam 153, thereby imparting to said arm an oscillatory reciprocating movement.

The wrappers or labels thus successively delivered from the stack or pile contained in the rack are presented by the feeding device above described between two feeding belts 110 and 659, by which the wrapper is delivered into a chute 112 down which it falls as indicated by dotted lines 660, Fig. 1, until it rests upon a stop base 113, and when occupying this position said wrapper or label is ready to be carried or folded upon a compressed mass or cake of the material as the latter is forced into a receiving pocket 648 of the carrier 96. The carrier belts 110, 659, may be operated in closely adjacent parallel relation to each other with the contacting or juxtaposed portions thereof moving in the same direction in any suitable or convenient manner. I have shown a simple arrangement wherein the belt 110 operates over a pulley on shaft 106$^a$ which is driven from the main shaft 49 of the machine through a sprocket chain 137, or other suitable form of gearing. The belt 110 thence passes around a guide roller 33 on a shaft 109 positioned above the shaft 106. The cooperating belt 659, operates over a pulley 34$^a$ on said shaft 106, and the wrappers as delivered from the rack as above described are presented edgewise into the throat formed between the adjacent surfaces of rollers 33 and 34$^a$. From the roller 33 the belt 110 passes partially around a pulley, on shaft 106$^a$, and thence downwardly and around a guide or idler pulley 111, carried upon a stud shaft 150. The belt 659 after passing over pulley 34$^a$ passes downwardly in closely adjacent relation to the belt 110 and around an idler or guide pulley 661.

It is desirable to regulate the approach of the clamping and carrying surfaces of the belts 110, 657, towards and from each other. Any suitable or convenient arrangement for accomplishing this result may be employed. A simple arrangement is shown wherein the shaft 150 carrying the idler or guide pulley 111 is mounted in a pivoted frame 662, which may be adjusted towards and from the frame 29 by means of the adjusting screw 663.

During the travel of the wrappers or labels from the rack into position to be received in the wrapping disk 96, it may sometimes be desirable to apply thereto strips or lines of mucilage, glue or other adhesive. Various arrangements may be employed for accomplishing this result. A simple arrangement, to which, however, I do not desire to be limited or restricted, is shown wherein a glue pot or receptacle 47 is suitably supported upon a portion of the frame work 29. Operating within this receptacle 47 is a roller 142 mounted upon a shaft 141', which roller dips into the adhesive contained in the receptacle 47 and transfers such adhesive during the rotations thereof to a transfer roll 143 mounted on a corresponding shaft also designated by reference numeral 141 (see Fig. 1), which is arranged to contact peripherally with the wrappers as they are fed along by the feed belts 659, 110. A cover plate 139 may be provided for the adhesive receptacle. In order to properly regulate the amount of adhesive delivered from roll 142 to roll 143 a scraper device 140 may be arranged to co-operate with the peripheral surface of the roller 142 to regulate the amount of adhesive carried thereby. The roll 143 is suitably geared frictionally, or otherwise, to be driven from roll 142, and the latter is geared frictionally, or otherwise, with a gear 145 mounted upon a shaft 146, which shaft may be driven in any suitable manner by the sprocket chain 137.

I will now describe the folding operations by which the wrapper or label is folded upon the compressed body or mass of material. It will be understood from the foregoing description that when the compressed cake or mass of material is delivered into a pocket 648 in the folder disk or wheel 96 it carries along with it a wrapper or label which has been deposited in proper position, as above described, so that when the compressed cake of material is inserted into its receiving pocket in the disk 96 the wrapper may be applied therearound, as indicated in Fig. 22, the wrapper being thus applied to the inner edge of the cake and to the top and bottom sides thereof. While held in the pocket 648, after being forced therein, and before the carrier 96 is advanced through another step of its rotative movement, means are thrown into action for bending one of the free ends of the wrapper partially across the other edge of the compressed cake. This may be accomplished in many different ways. A simple arrangement is shown wherein a tucking or folding finger 98 is carried by or forms part of an arm 664, which is loosely sleeved upon shaft 97, for rocking movement thereon. Connected to the hub of the arm 664 is a pin 101 to which is pivotally connected one end of a rod 100, the other end of which is adjustably and pivotally connected to a link 102 which is pivoted upon a cooperating stud 101ª mounted in the frame work of the machine. The free end of link 102 cooperates with a pin 103 mounted upon the face of disk 104 carried by and rocking with shaft 90.

The pin 103 is free to move past the end of link 102 when the disk 104 is rotatively moved in the direction of the hands of a clock its connection with the end of rod 100 being of such nature as to permit this. In the reverse rotative movement of disk 104, however, said pin 103 engages behind the end of link 102 and rocks the same towards the left as shown in Fig. 1ª thereby drawing rod 100 and hence rocking arm 664 and causing the finger 98 thereon to advance and engage one of the free ends of the wrapper and fold the same, in this instance, upwardly, against the outer side edge of the compressed cake and into the condition indicated in Fig. 23. This operation takes place during the period of rest of the carrier 96 in position to receive a compressed cake of the material. The next rotative actuation of carrier 96 carries the pocket containing the partially applied wrapper or label on into the next position for the further folding operations.

Figure 4:
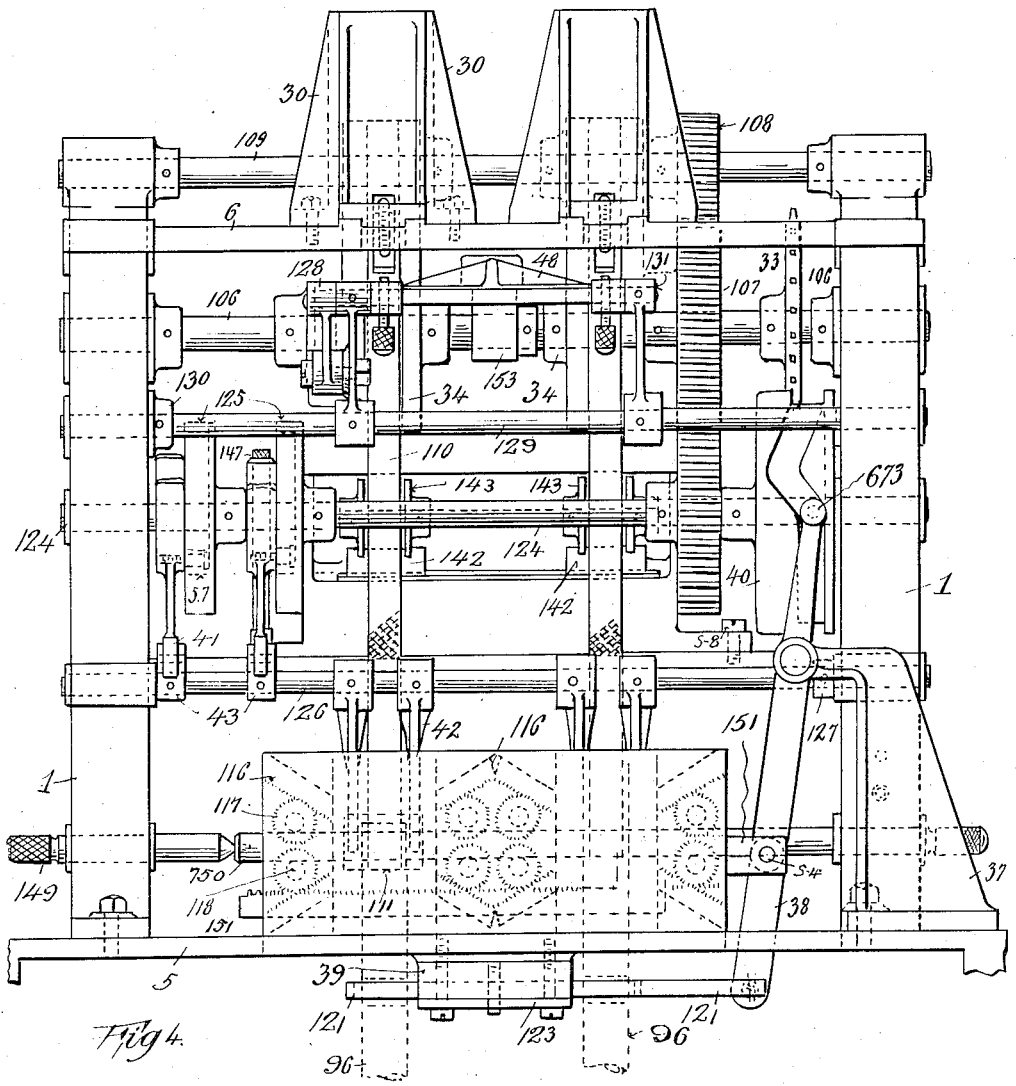
Fig. 4 is a view in side elevation showing the wrapper applying mechanism.

During the movement of the carrier 96 from receiving position into its next position of rest, the other free end of the wrapper is engaged beneath a presser plate 114 suitably supported upon the frame work, as, for instance, by means of a strut or brace 115, whereby the other free end of the wrapper is folded down over the previously folded end of the wrapper and against the side of the cake of material and into the condition indicated in Fig. 24. During the next period of rest of the carrier 96 the folding of the side ends or edges of the partially applied wrapper is completed. Various means may be employed for accomplishing these final folding operations. A simple arrangement is shown, see particularly Figs. 17, 18 and 19, wherein tucking plungers 116 are employed. These are in the form of racks carrying the wrapper engaging heads 670. In practice I prefer to yieldingly mount the heads 670 in the racks 116, and for this purpose I arrange a spring 671 in the plunger racks to engage and tend to press outwardly away from such racks the heads 670 or the stems thereof. The plunger racks 116 are arranged in groups to operate on the unfolded portions of the wrapper in the respective ends of the cake. I therefore arrange a pair of folder racks 116 to operate at each side of the carrier or wheel 96, the members of each pair of folder racks being inclined with reference to each other, as clearly indicated in the detail view of Fig. 17. These racks are advanced simultaneously in their inclined paths towards the ends of the cake of material which extends beyond the respective sides of the carrier disk 96 in any suitable or convenient manner, as, for instance, by means of pinions engaging said racks, said pinions being enmeshed and actuated in unison with each other, that is, the pinions for the sets of plunger racks are simultaneously operated, and this is accomplished by means of a rack bar 151, made to engage the proper pinions. In the case of a duplex machine this rack bar is arranged to simultaneously operate the pinions associated with all the sets of rack bars, and said bar 151 is suitably shaped and formed with rack teeth for this purpose see Figs. 17 and 18. The rack bar 151 may be operated in any suitable or convenient manner. A simple arrangement for accomplishing this is shown, see Fig. 4, by means of a rocking lever 38 fulcrumed upon a convenient fixed part of the frame work, as, for example, a standard 37, and having a roller 673 engaging in a cam groove formed in a cam 40 carried by shaft 124. This shaft is rotated through gears 107 from shaft 106, which, as above explained, is driven by means of sprocket chain 137 from the main shaft 49. The rock lever 38 is connected to the rack bars 151 and 121, see Fig. 4. The wrapper mechanism may be conveniently adjusted by thumb adjusting pins 149 supported in frame 1, the inner ends of which may be pointed to engage bar 750, as shown in Fig. 4.

The action of the plunger head 670 of the rack plungers 116 is to fold the partially folded wrapper into the form shown in Fig. 25, thus leaving two unfolded side flaps at each end of the package. The final wrapper applying operation is directed towards folding these flaps of the wrapper down over the ends of the cakes to complete the wrapper applying operation. This operation may be accomplished in many different ways. A simple arrangement is shown wherein bell cranks 42 are pivotally mounted at their angles upon shafts 126, the other arms 43 of said bell cranks being connected to arms 41, which are formed into yokes to straddle shaft 124. These arms 41 carry pins 645 which operate in cam grooves in disk 125 mounted upon shaft 124, whereby said arms 41 are reciprocated, thereby rocking the bell cranks 42 and causing the blade ends 676 thereof to advance and engage the remaining unfolded portions of the wrapper and fold the same upon the cake of material to complete the wrapper applying operations. The arms 42 are so timed in their operation that one of them is advanced to its work and is withdrawn before the other is advanced to its work. The action of the first arm 42 to complete its work leaves the package in the form indicated in Fig. 26. Thereafter the other arm 42 is advanced to its work to fold over the remaining unapplied portion of the wrapper or label, and when it completes its work the package is left in the form shown in Fig. 27, and the wrapper or label applying operations are then complete.

While the operation of the plunger racks 116 and plunger heads 670 and the folder arms 42 is in progress, the carrier 96 is held stationary and is receiving another compressed cake or mass of material with a wrapper or label preliminarily applied thereto. After the completion of the action of the plunger racks and folder arms 42, the carrier 96 is then advanced through its next step of actuation to bring another empty pocket 648 into position to receive a compacted cake of material and a preliminarily applied wrapper and into position for the preceding completely wrapped package to be brought into position to be ejected from the machine. Any suitable or convenient ejector mechanism may be employed for this purpose. A simple arrangement is shown, see particularly the detail Fig. 20, wherein a rack member 121 is connected to the lever 38 so as to be reciprocated thereby when said lever is rocked. This rack member is formed with or carries an ejecting finger 677 arranged to move into the seat 648 in carrier 96, or into one of them in the case of a duplex machine, to eject from said pocket the wrapped package contained therein. In the case of a duplex machine, for example, an auxiliary rack 678 likewise formed with or carrying an ejecting finger 679 operates in conjunction with the pocket 648 in the other carrier 96. In practice, however, I prefer that the packages be ejected from the carriers 96 in the case of duplex machines towards each other, and therefore I arrange the racks 121 and 678 to move in respectively opposite directions. In this case the auxiliary ejector rack 678 may be operated by means of a pinion 117 engaging in rack teeth formed on both rack bars 121, 678. The pinion 117 is carried upon a suitable stud shaft.

After the completed packages are ejected from the carrier or carriers 96 they may be received in any suitable or convenient manner, as, for instance, on a conveyor belt, according to usual shop practice or in any other convenient way.

It may sometimes be necessary to provide for forming and packaging different sizes of cakes or masses of material without changing the wrapping carrier disk 96. It may also be desirable to afford a desirable degree of friction on the cakes of material within the pockets in the carrier disk 96 to efficiently resist the action of the folding devices or any tendency of the folding devices to displace the cakes. To accomplish this result I may provide the pockets 648 in carrier 96 with one or more yieldable walls. Such an arrangement is shown in detail in Fig. 21 wherein a block 680 is designed to be set into the pockets formed in the carrier disk 96, said block having one or more yielding wall portions 681 to accommodate slightly different sizes and dimensions of cakes of compressed material and to afford a desirable friction thereon while being held in the pocket 682 in the block 680.

Having now set forth the objects and nature of my invention, and a construction embodying the principles thereof and having explained such construction, its purpose, function and mode of operation, I desire it to be understood that many variations and changes in the details might readily occur to persons skilled in the art and still fall within the spirit and scope of my invention.

What I claim, however, as new and useful and of my own invention and desire to secure by Letters Patent is,—

In a machine for forming and wrapping packages, the combination with a carrier having pockets to receive the formed packages and the wrappers therefor, and means to actuate said carrier, tucker plungers arranged in pairs, pinions to actuate said plungers and a rack bar to simultaneously rotate said pinions.

In testimony whereof I have hereunto set my hand on this 5th day of February, A. D. 1920.

EDWARD F. VOLKMER.